May 24, 1960 N. BERMAN ET AL 2,938,198
ANALOGUE TO DIGITAL TRANSDUCER
Filed Aug. 10, 1956 5 Sheets-Sheet 1
FIG. 1
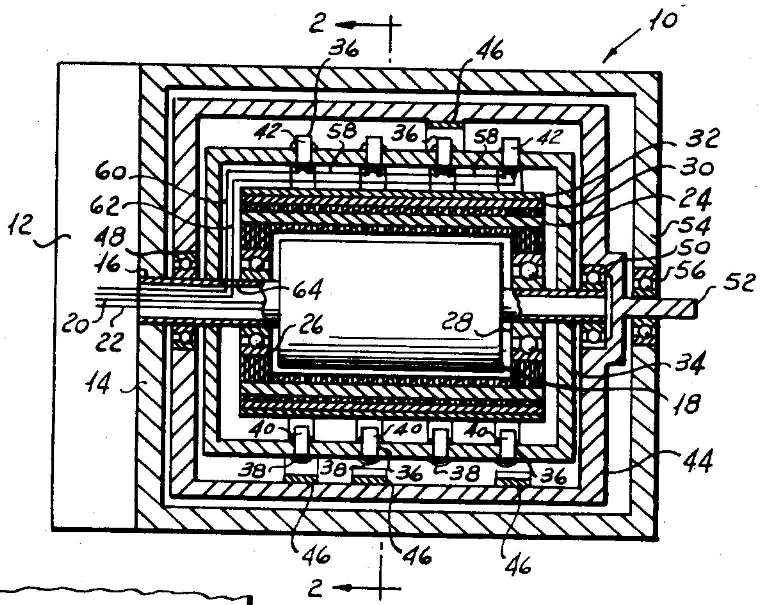
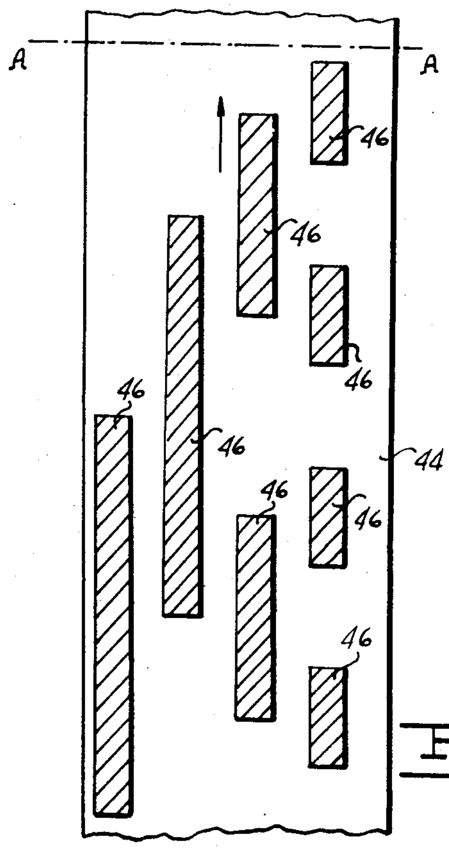
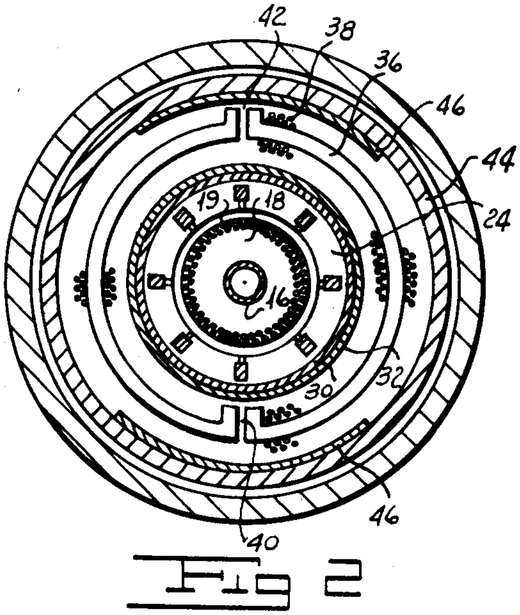
FIG. 2
FIG. 3
INVENTORS
NELSON BERMAN
SHELDON GIRSCH
BY
Henry L. Shenier
ATTORNEY May 24, 1960 N. BERMAN ET AL 2,938,198

ANALOGUE TO DIGITAL TRANSDUCER

Filed Aug. 10, 1956 5 Sheets-Sheet 2

INVENTORS
NELSON BERMAN
SHELDON GIRSCH
BY Henry L. Shenier
ATTORNEY

May 24, 1960 N. BERMAN ET AL 2,938,198

ANALOGUE TO DIGITAL TRANSDUCER

Filed Aug. 10, 1956 5 Sheets-Sheet 3

INVENTORS
NELSON BERMAN
SHELDON GIRSCH
BY
Henry L. Shenier
ATTORNEY

ANALOGUE TO DIGITAL TRANSDUCER

Filed Aug. 10, 1956 5 Sheets-Sheet 4

INVENTORS
NELSON BERMAN
SHELDON GIRSCH
BY
ATTORNEY

INVENTORS
NELSON BERMAN
SHELDON GIRSCH
BY Harry L. Shenier
ATTORNEY

United States Patent Office 2,938,198

Patented May 24, 1960

2,938,198

ANALOGUE TO DIGITAL TRANSDUCER

Nelson Berman, New Hyde Park, and Sheldon Girsch, Long Island City, N.Y., assignors, by mesne assignments, to United Aircraft Corporation, East Hartford, Conn., a corporation of Delaware Filed Aug. 10, 1956, Ser. No. 603,427

14 Claims. (Cl. 340—347)

Our invention relates to an improved analogue to digital transducer and more particularly to an improved analogue to digital transducer for producing a binary coded representation of some function of the position of a movable member such as a shaft or the like.

Devices are known in the prior art for producing a group of signals which afford a binary coded representation of the position of a movable member such as a shaft or the like. These devices of the prior art employ brushes or the like which make and break contact with conducting segments arranged in a pattern corresponding to the desired representation. It will be appreciated that the brushes in these devices require frequent adjustment to ensure that proper contact is made with the segments. Further, these devices require relatively frequent cleaning and replacement of worn brushes. In making and breaking contact, the brushes of transducers of the prior art produce "noise" in the form of unwanted output signals. Analogue to digital transducers of the prior art produce a number of individual signals, each of which represents one digit of the binary representation. If it is desired to reproduce this representation at a location remote from the device which generates the signal, each signal must be conveyed independently over a separate channel to the location at which it is desired to reproduce the representation. It will be appreciated that this manner of transmission is inconvenient and expensive.

We have invented an analogue to digital transducer which produces a binary coded digital representation of the position of a movable member such as a shaft or the like without the use of brushes. Our transducer operates for a relatively long period of time without requiring the maintenance necessary in transducers employing brushes. Further, in one form of our transducer, a single signal embodying the desired representation is produced. This signal may readily be transmitted over a single channel such as a pair of conductors from a signal generating device to a remote location at which it is desired to reproduce the representation, or it may be transmitted over a wireless radio link. Our device is adapted to produce arbitrary output signals or output signals which are representative of some function of the position of a movable member such as a shaft or the like.

One object of our invention is to provide an analogue to digital transducer for producing a binary coded digital representation of the position of a movable member such as a shaft or the like without the use of brushes.

A further object of our invention is to provide an analogue to digital transducer which operates for a long period of time without maintenance.

Another object of our invention is to provide an analogue to digital transducer for producing a single output signal embodying a binary coded digital representation of the position of a movable member such as a shaft or the like.

A still further object of our invention is to provide an analogue to digital transducer, the output signal of which may readily and expeditiously be transmitted to a remote location.

Yet another object of our invention is to provide an analogue to digital transducer which produces an output signal which may embody a binary coded representation of some non-linear function of the position of a rotating shaft.

Other and further objects of our invention will appear from the following description:

In general our invention contemplates the provision of an analogue to digital transducer including electromagnetic means for producing a number of alternating current voltages corresponding to the number of binary digits required to produce the desired representation. We provide auxiliary magnetic means for varying the respective amplitudes of the signals in accordance with a code to produce the desired representation. In one form of our invention the magnetic means varies the reluctance of a magnetic flux path to vary the signal amplitudes. In another form of our invention the magnetic means acts as a shunt for magnetic flux to vary the signal amplitudes. One embodiment of our invention produces signals of different respective frequencies which may be mixed and transmitted to a remote location over a single pair of conductors.

In the accompanying drawings which form part of the instant specification and which are to be read in conjunction therewith, and in which like reference numerals are used to indicate like parts in the various views:

Figure 1 is a sectional view of one form of our improved analogue to digital transducer.

Figure 2 is a sectional view of the form of our analogue to digital transducer shown in Figure 1, taken along the line 2—2 of Figure 1.

Figure 3 is a development of the inner surface of the segment-pattern-carrying drum of the form of our analogue to digital transducer shown in Figure 1, showing the segments in section for purposes of clarity.

Figure 4:
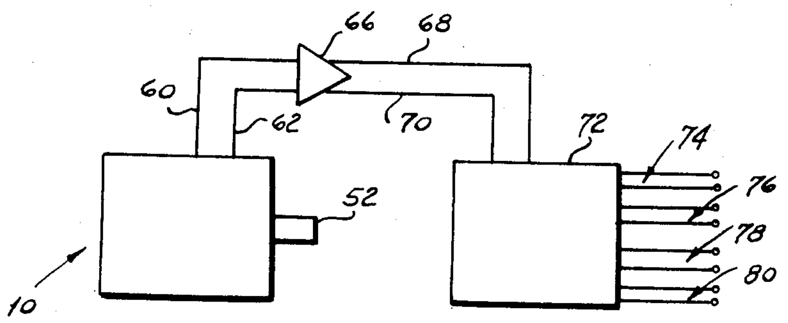
Figure 4 is a schematic view showing the manner in which the signal generated by the form of our analogue to digital transducer shown in Figure 1 may be transmitted to a remote location and analyzed at the remote location.

More particularly referring now to Figures 1 to 3 of the drawings, this form of our improved analogue to digital transducer includes a housing, indicated generally by the reference character 10, formed with a terminal panel 12 to which various conductors to be described in detail hereinafter are secured to permit connections to be made to an external circuit. One end 14 of housing 10 supports a hollow stationary shaft 16 which carries the stator 18 of a motor which may, for example, be a single-phase induction motor of the squirrel cage type. Respective conductors 20 and 22 connected to a suitable source of electrical power (not shown) provide a means for energizing winding 19 of stator 18. The motor of this form of our transducer includes a squirrel cage rotor 24 supported on respective bearings 26 and 28, carried by the hollow shaft 16. We cover the outer surface of rotor 24 with a shield 30 of nonmagnetic conducting material such as aluminum or the like. We coat the surface of shield 30 with a recording medium such, for example, as ferrous oxide or the like. This coating 32 may be applied in any manner known to the art.

Shaft 16 carries a stationary magnetic pickup device support 34. Support 34 carries a plurality of respective magnetic pickup devices, each of which includes a laminated core 36 of magnetic material and a winding 38 disposed around the core. Each core 36 includes a first air gap 40 directed toward the outer surface of rotor 24 to be traversed by the magnetized coating 32. Each of the cores 36 includes a second air gap 42 directed radially outwardly.

We magnetize the coating 32 along a plurality of axially spaced circumferential paths corresponding to the number of pickup devices. Coating 32 is magnetized along each path in accordance with a signal of a filterably different respective frequency. When electrical energy is supplied to stator 18 through conductors 20 and 22, rotor 24 rotates to move the magnetized coating 32 past the air gaps 40. As this rotation takes place, signals of different respective frequencies are induced in the windings 38 of the pickup devices of our transducer.

If magnetic material, such as soft iron or the like, is placed adjacent the air gap 42, the reluctance of the magnetic path afforded by the core 36 is reduced, with the result that the amplitude of the signal induced in winding 38 as the magnetized coating 32 rotates is increased. We provide a drum 44 carrying a plurality of segments 46 of magnetic material. We arrange segments 46 on drum 44 so that in any angular position of the drum magnetic segments are disposed adjacent certain of the air gaps 42 to vary the amplitudes of the respective signals induced in windings 38 in accordance with the pattern of segments on the drum.

Respective bearings 48 and 50 rotatably support drum 44 with respect to housing 10. A stub shaft 52 formed on drum 44 extends through end 54 of housing 10. A bearing 56 in end 54 permits relative rotation between housing 10 and shaft 52. It will be seen that shaft 52 permits the drum 44 to be positioned with respect to the magnetic pickup devices to vary the amplitudes of the respective signals induced in the windings 38 in accordance with shaft position.

Since the signals induced in the respective windings 38 are filterably different frequencies, they may be mixed for transmission over a single channel to a remote location. Conductors 58 connect the windings 38 of adjacent pickup devices in series. Output conductors 60 and 62 pass through an opening 64 in hollow shaft 16 to carry the mixed signals to terminal panel 12 for transmission to a remote location. As will be explained hereinafter in detail, the mixed signals are filtered and rectified at the remote location.

We provide a number of rows of segments corresponding to the number of pickup devices. These rows of segments may be arranged in any desired configuration. For example, as they may be arranged in accordance with the natural binary code in which case each row represents one digit in this code. In order to reduce the possibility of ambiguity in our device, we have shown the segments as being arranged in accordance with the "Gray" code. As is known in the art, an ambiguity occurs when a "1" should change to a "0" and does not, or vice versa. In the natural binary code, if this occurs only in the least significant digit of the binary representation, the ambiguity will be between two consecutive numbers, since the other digits of the binary representation are certain. However, in fact, the ambiguity may occur in digits other than the least significant digit of the binary representation with the result that the ambiguity may be between two numbers which are not consecutive but which are relatively far removed from each other. It will be appreciated that if a system can be provided in which ambiguity can exist only between two consecutive numbers, possible error due to ambiguity will be less than the error possible in the natural binary code. The "Gray" code is such a system which ensures that any ambiguity which may exist occurs only between two consecutive numbers. The arrangement of segments in the "Gray" code is such that only one digit of the binary representation changes in going from one number to a consecutive number. If the digit which should have changed did not change, the ambiguity can only be between two consecutive numbers. This will be apparent from the following table in which the "Gray" code representation is given for the numbers from zero to fifteen.

*Table 1*

| Decimal Number | "Gray" Code Representation | | | |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 1 | 0 | 1 |
| 10 | 1 | 1 | 1 | 1 |
| 11 | 1 | 1 | 1 | 0 |
| 12 | 1 | 0 | 1 | 0 |
| 13 | 1 | 0 | 1 | 1 |
| 14 | 1 | 0 | 0 | 1 |
| 15 | 1 | 0 | 0 | 0 |

As has been explained hereinabove, the rotating magnetized coating 32 continuously induces voltages of different frequencies in the respective pickup devices including windings 38. If no magnetic segment 46 is adjacent the air gap 42 of a pickup device, the induced alternating current signal in the corresponding winding 38 is below a definite amplitude and thus represents a "0" in the binary system. If a magnetic segment 46 is positioned adjacent the gap 42 of a pickup device, the amplitude of the signal induced in the corresponding winding 38 increases above the predetermined amplitude to represent a "1" in the binary system. For purposes of simplicity, we have shown an analogue to digital transducer including only four pickup devices and four circumferential rows of segments 46. We have arranged our segments 46 in accordance with the "Gray" code to provide a representation in accordance with Table I (above) as shaft 52 is driven through a complete revolution. As drum 44 is rotated from the zero position, indicated by the line A—A in Figure 3, in the direction of the arrow in Figure 3 past the gaps 42 of the pickup devices, the respective induced voltages in the windings 38 have magnitudes in accordance with Table I (above) to provide a binary representation in the "Gray" code of the angular position of shaft 52. While we have shown our segments 46 as being arranged in accordance with the "Gray" code, it will be understood that any other digital code may be employed. Further, we may employ any practicable number of magnetic pickup devices and rows of segments to provide a binary representation including as many digits as desired. This may be accomplished by lengthening our device axially of shaft 16 to accommodate a greater number of rows. It will be appreciated that as the number of rows is increased, the number of segments in the respective rows must be increased. For a given diameter of the segment-pattern-carrying drum 44, the number of digits which can be produced is limited by the ability of the pickup device to distinguish a "zero" from a "one" in the row containing the maximum number of segments.

Referring now to Figure 4, we feed the signal carried by conductors 60 and 62 to an amplifier 66. Conductors 68 and 70 carry the output signal from amplifier 66 to a remote location at which we provide a filtering and rectifying network 72. This network 72 includes filters, of a type known to the art, tuned to the respective predetermined frequencies, which separate the signal carried by conductors 68 and 70 into its component voltages of different respective frequencies. Rectifiers associated with the respective filters rectify the separated voltages to produce a number of unidirectional pulse output signals equal to the number of voltages or digits. Respective pairs of output conductors, indicated generally respectively by the reference characters 74, 76, 78, and 80 carry the pulse output signals to suitable indicating or decoding devices of a type known to the art and hence not shown. Each of the pulse signals impressed on the respective pairs of conductors 74, 76, 78, and 80 represents a digit in the binary code. Pulses over a certain magnitude represent a "1" in the binary code, while pulses of less magnitude represent a "0." Since the amplitudes of the component voltages of the several frequencies making up the signal on conductors 68 and 70 vary in accordance with a binary coded digital representation of the position of shaft 52, the magnitudes of the pulses in the respective pulse outputs of the pairs of conductors 74, 76, 78, and 80 vary in accordance with the desired representation.

Figure 5:
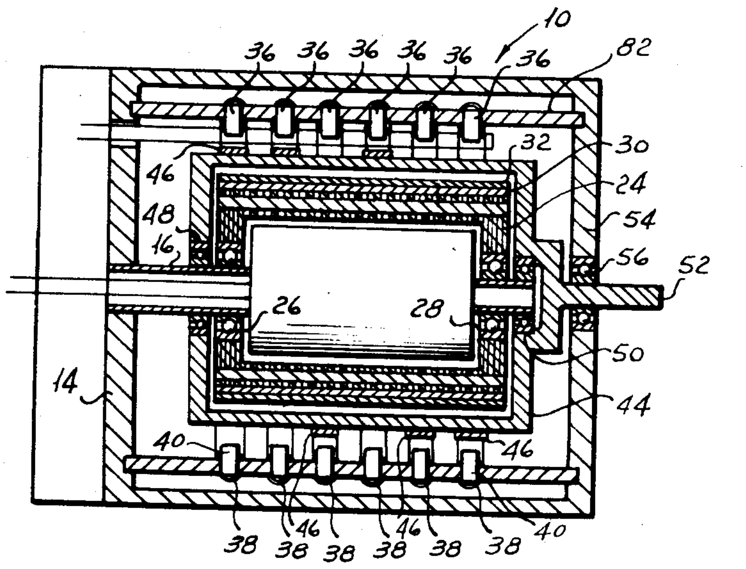
Figure 5 is a sectional view of another form of our improved analogue to digital transducer.

In the form of our transducer shown in Figures 1 to 3, we vary the amplitudes of the respective voltages in the pickup windings 38 by varying the reluctance of the respective paths of the magnetic fluxes emanating from the coating 32 and linking the windings 38. In Figure 5 we have shown a form of our invention in which the magnitudes of the voltages induced in the pickup windings are varied by shunting the fluxes from the coating before they reach the air gaps 40. Like members in this figure to those in Figures 1 to 3 are identified by similar reference characters. In this form of our invention the magnetic pickup devices including windings 38 are carried by a stationary shell 82 fixed in the ends 14 and 54 of housing 10. The pattern drum 44 in this form of our invention is disposed between the shell 82 and the coating 32 on rotor 24. As in the form of our invention shown in Figures 1 to 3, as rotor 24 rotates coating 32 past the air gaps 40 of cores 36, the windings 38 have voltages of different respective frequencies induced therein. If, however, a segment 46 is adjacent the air gap 40, the flux from coating 32 is shunted or shielded and prevented from influencing the winding 38, with the result that the amplitude of the signal induced in the winding is decreased. In this form of our invention an induced voltage has a greater amplitude when no segment is adjacent the air gap 40 and a lesser amplitude when a segment is shielding the air gap 40. It is to be understood further in this form of our invention that cores 36 need only be provided with a single air gap 40, and that no air gap 42 is necessary.

Figure 6:
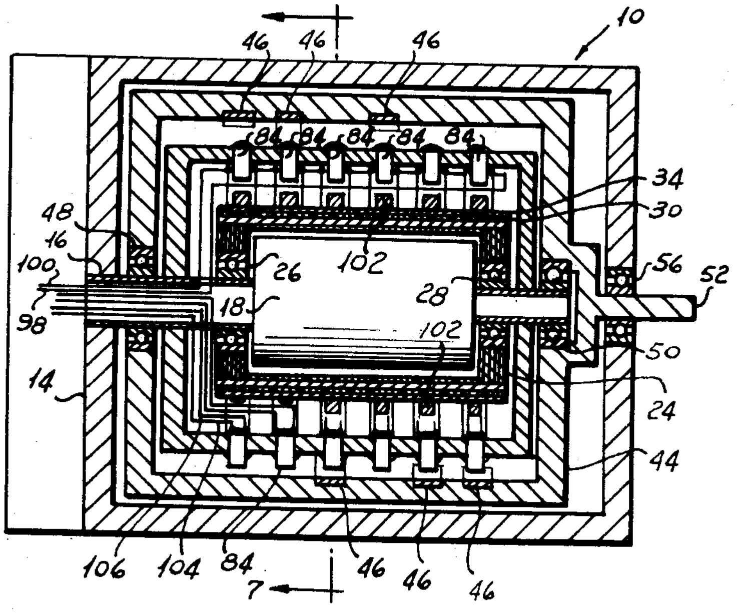
Figure 6 is a sectional view of a further form of our improved analogue to digital transducer.
Figure 7:
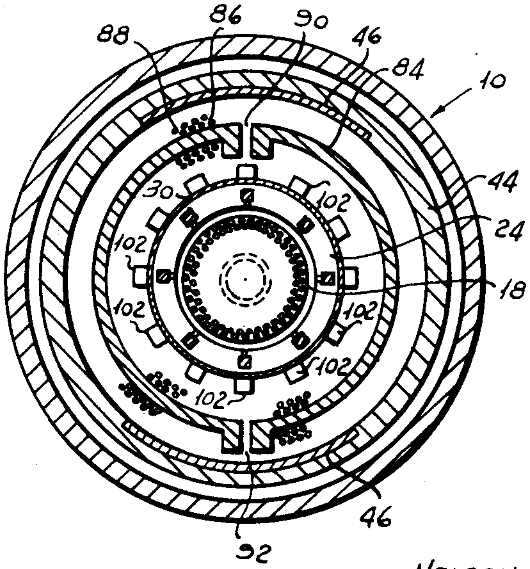
Figure 7 is a sectional view of the form of our improved analogue digital transducer shown in Figure 6, taken along the line 7—7 of Figure 6.
Figure 8:
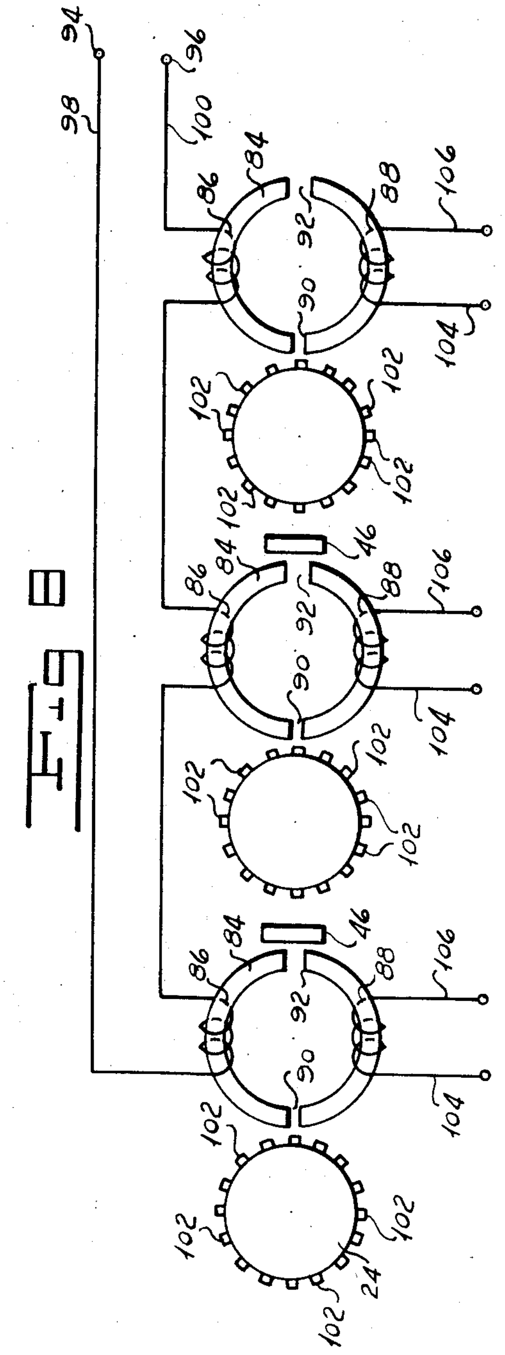
Figure 8 is a schematic view of the form of our improved analogue to digital transducer shown in Figures 6 and 7.

Referring now to Figures 6 to 8, we have shown a form of our invention in which a direct current input signal is converted to respective alternating current signal outputs, each of the same or, if desired, of different frequency, the amplitudes of which are varied in accordance with a binary code. As in the form of our invention shown in Figures 1 to 3, the housing 10 has an end 14 carrying the hollow stationary shaft 16 of the stator 18 of the motor including rotor 24. In this form of our invention the support 34 carries a plurality of transformers each of which includes a core 84 carrying a primary winding 86 and a secondary winding 88. Each core 84 is formed with a pair of air gaps 90 and 92 directed respectively radially inwardly and radially outwardly with respect to shaft 16. As can be seen by reference to Figure 8, a suitable source of direct current potential including terminals 94 and 96 supplies energy to the series-connected primary windings 86 through conductors 98 and 100. We mount a plurality of axially spaced circumferential rows of spaced soft iron teeth 102 on rotor 24. As rotor 24 rotates and a tooth 102 passes by the inwardly directed air gap 90 of a core 84, the reluctance of the flux path of the core is varied. As this reluctance changes, the flux linking the secondary winding 88 carried by the core varies, with the result that a potential is induced in the winding. As the rotor 24 rotates continuously, the reluctance of each core varies, with the result that an alternating current potential is induced in the secondary winding 88 of each of the transformers. The frequency of this alternating voltage, at a constant speed, is a function of the number of teeth in a circumferential row. We provide a number of transformers and a corresponding number of toothed rotors equal to the number of digits required for the binary representation.

We provide means for varying the amplitudes of respective voltages induced in the secondary windings 88 in accordance with a binary coded pattern. Drum 44 carries a plurality of segments 46 similar to the segments 46 of the form of our invention shown in Figures 1 to 3. Conveniently these segments may be embedded in the inner surface of drum 44. We provide a number of axially spaced circumferential rows of segments 46 corresponding to the number of transformers employed. These segments may be arranged in any pattern to provide the desired representation. Conveniently we arrange them in accordance with the "Gray" code, as explained hereinabove in connection with Figure 3. If the position of drum 44 is such that a magnetic segment is adjacent the outwardly directed air gap 92 of a transformer, the secondary voltage of the transformer has a greater amplitude than when no segment is adjacent its air gap 92. This condition results from the fact that presence of a segment 46 adjacent the gap 92 further reduces the reluctance of the flux path of the core.

In the form of our invention shown in Figures 6 to 8 each row of soft iron teeth 102 includes the same number of teeth. Consequently, all the secondary voltages of the transformers are of the same frequency. These voltages must therefore be brought out independently to terminal board 12 through respective pairs of conductors 104 and 106.

Figure 9:
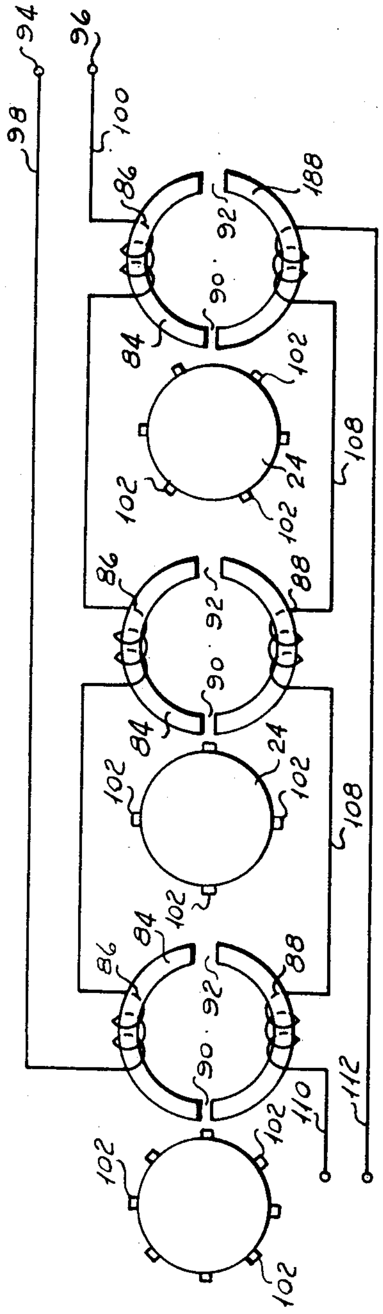
Figure 9 is a schematic view of still another form of our improved analogue to digital transducer.

Referring now to Figure 9, we have shown a form of our invention in which the number of soft iron teeth in the respective rows of teeth corresponding to the transformers employed in the form of our invention shown in Figures 6 to 8 is varied to produce voltages of different respective frequencies in the secondary windings 88. With this arrangement the secondary output voltages may be mixed and carried over a single pair of conductors to a remote location. In this form of our invention we connect the secondary windings 88 in series by conductors 108 and carry the mixed secondary voltages to a remote location over conductors 110 and 112.

In the form of our invention shown in Figure 9 the voltages of different respective frequencies in windings 88 result from the rotation of the tooth-carrying rotor 24. It will be appreciated that we may, if desired, generate the respective frequencies externally by oscillators or multivibrators and feed the voltage to the respective windings 88.

Figures 10, 11, 12:
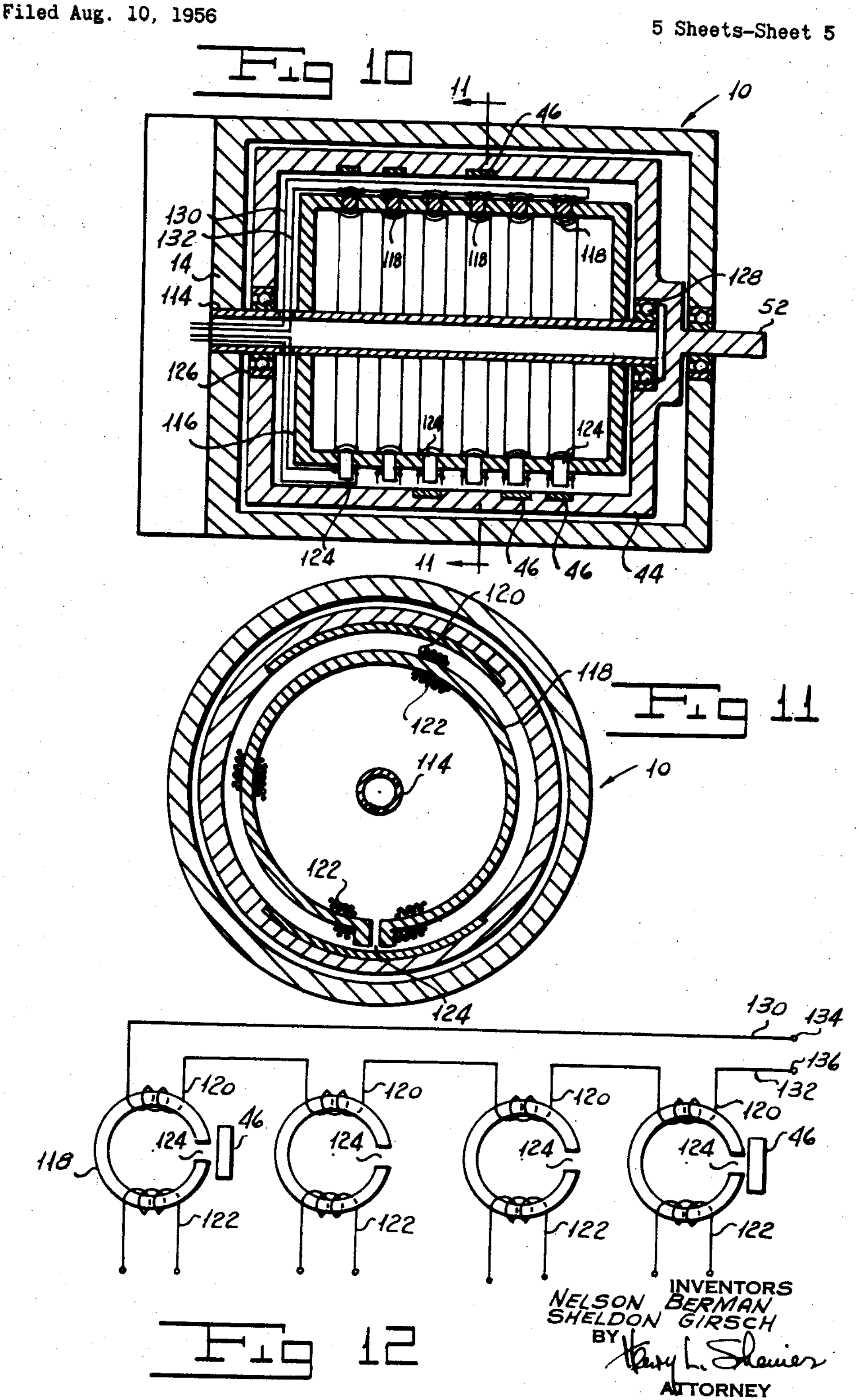
Figure 10 is a sectional view of a still further form of our improved analogue to digital transducer.
Figure 11 is a sectional view of the form of our improved analogue to digital transducer shown in Figure 10, taken along the line 11—11 of Figure 10.
Figure 12 is a schematic view of the form of our improved analogue to digital transducer shown in Figures 10 and 11.

In the form of our invention shown in Figures 10 to 12 side 14 of housing 10 supports a hollow shaft 114 which carries a support 116. We mount a plurality of respective transformers including cores 118 carrying respective primary and secondary windings 120 and 122 on support 116. Respective conductors 130 and 132 connect the series-connected primary windings 120 to a source of alternating current potential including terminals 134 and 136. It will be seen that, owing to the energization of windings 120 from the source including terminals 134 and 136, respective alternating current voltages are induced in secondary windings 122. Each of the cores 118 is formed with an outwardly directed air gap 124. Respective bearings 126 and 128 support the pattern carrying drum 44 on shaft 114. When a segment 46 carried by drum 44 is in a position adjacent the air gap 124 of a core 118 the secondary winding voltage has an amplitude which is greater than its amplitude when no segment 46 is adjacent the gap 124. As is explained hereinabove, segments 46 are arranged in a pattern to provide respective secondary winding output signals which embody a binary coded representation of the position of shaft 52. It is to be noted that in this form of our invention no motor including a stator 18 and rotor 24 is necessary. Further, only a single air gap 124 is required for the transformer cores 118 of this form of our invention.

While we have described our invention with respect to the angular position of a rotating member, it is to be understood that the pattern of segments carried by drum 44 may readily be arranged on a member providing a plane surface. If such a member were moved tangentially of the core past the air gaps, the output signals from our transducer would provide a binary digital representation of the linear position of the member.

In operation of the form of our invention shown in Figures 1 to 3, stator 18 is energized through conductors 20 and 22 to drive rotor 24 and its magnetized coating 32 continuously. As the magnetic tracks of coating 32 pass the air gaps 40 of the respective magnetic pickup devices, windings 38 have respective voltages of different frequencies induced therein. The magnetic members 46 carried by drum 44 are positioned with respect to air gaps 42 of cores 36 to vary the amplitudes of the respective voltages induced in windings 38 in accordance with the angular position of shaft 52. As has been explained hereinabove, we may arrange segments 46 to provide any desired binary digital representation. Conveniently, we have shown the segments arranged in a pattern to provide a binary digital representation in the "Gray" code of the angular position of shaft 52. Since the voltages induced in the respective windings 38 are of filterably different frequencies, they may be mixed and carried to a remote location over a single pair of conductors.

After being amplified the mixed voltages are carried to a filtering and rectifying network 72 at a remote location over a single pair of conductors 68 and 70. Network 72 filters and rectifies the signal carried by conductors 68 and 70 to separate it into the various components and to produce respective pulse output signals on the pairs of conductors 74, 76, 78, and 80.

In operation of the form of our invention shown in Figure 5, the magnetic segments 46 carried by drum 44 are positioned between the magnetized coating 32 and the pickup devices to shunt the magnetic flux from the coating to reduce the amplitudes of the respective signals in windings 38 in accordance with a desired coded pattern. This operation is to be contrasted with the operation of the form of our invention shown in Figures 1 to 3 in which the members 46 vary the reluctance of the magnetic paths rather than shunt the flux.

In operation of the form of our invention shown in Figures 6 to 8, the continuously rotating rotor 24 drives the rows of soft iron teeth 102 past the gaps 90 of transformer cores 84 to vary the reluctance of the flux path of the flux from primary windings 86. This action varies the flux linking secondary windings 88 to induce respective voltages in these secondary windings. The amplitudes of the respective voltages in secondary windings 88 are varied in accordance with a coded pattern by the magnetic segments 46 carried by drum 44. Presence of a segment 46 adjacent a gap 92 of a core 84 increases the amplitude of the corresponding secondary winding voltage to represent a "0" in the binary system. Where each row of teeth 102 includes the same number of teeth, the frequencies are the same and the voltages must be carried independently out to terminal board 12. As is shown in Figure 9, the number of teeth 102 in the respective rows of teeth associated with the transformers may be varied to produce voltages of different respective frequencies in secondary windings 88. When this is done, the voltages may be mixed and conveyed to a remote location over a single pair of conductors.

In operation of the form of our invention shown in Figures 10 to 12, the series-connected primary windings 120 are energized from a source of alternating current potential continuously to induce alternating current voltages in secondary windings 122. The positions of segments 46 adjacent the gaps 124 of cores 118 vary the amplitudes of the secondary winding voltages in accordance with the coded pattern. This form of our invention requires no motor and only a single core air gap.

It will be seen that we have accomplished the objects of our invention. We have provided an analogue to digital transducer for producing a binary digital representation of the position of a movable member with respect to a stationary member without the use of brushes. Since our transducer employs no brushes, less "noise" is produced in its operation than in operation of transducers of the prior art employing brushes. Our transducer operates for a relatively long period of time without requiring the maintenance necessary in transducers of the prior art. In one form of our transducer it produces a single signal which emodies the binary digital representation and which may be transmitted to a remote location over a single pair of conductors.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. An analogue to digital transducer for producing a digital representation of some function of the position of a shaft including in combination a drum, means for continuously rotating said drum, a plurality of magnetic pickup devices adjacent said drum, respective magnetic means carried by the drum for inducing respective voltages of different frequencies in said pickup devices, means for varying the respective amplitudes of said voltages in accordance with a digital code and with the position of said shaft and means for connecting said pickup devices in series.

2. An analogue to digital transducer as in claim 1 in which said pickup devices provide respective magnetic paths for magnetic flux from said drum carried magnetic means, said means for varying the amplitudes of said voltages including means for varying the respective magnetic reluctances of said paths.

3. An analogue to digital transducer as in claim 1 in which said amplitude varying means include a second drum, a plurality of rows of paramagnetic segments carried by the second drum, said rows of segments being positioned on the second drum in alignment with said magnetic pickup devices and means for rotating said second drum with respect to said pickup devices as a function of said shaft position.

4. An analogue to digital transducer as in claim 1 in which each of said pickup devices includes a core formed with an air gap, said means for varying the amplitudes including a second drum, a plurality of rows of paramagnetic segments carried by said second drum, said rows of segments being positioned in alignment with the respective air gaps of said cores, the segments of said rows being arranged in accordance with a binary code and means for rotating said second drum with respect to the pickup devices.

5. An analogue to digital transducer for producing a digital representation of some function of the position of a shaft including in combination means for generating a number of voltages of different respective frequencies, means for varying the respective amplitudes of said voltages in accordance with a binary code as a function of the position of said shaft, means for combining said voltages to produce a signal which embodies said binary digital representation, means for resolving said signal into its component voltages and means for transmitting said signal from said generating means to said resolving means.

6. An analogue to digital transducer as in claim 5 including an amplifier for amplifying said signal.

7. An analogue to digital transducer for producing a digital representation of a function of the position of a movable member with respect to a stationary member including in combination means comprising magnetic flux producing means and means providing a plurality of respective magnetic flux paths for generating a number of respective alternating current voltages, respective means for varying the reluctances of said flux paths to vary the respective amplitudes of said voltages in accordance with a digital code as a function of the position of said movable member, means mounting said reluctance varying means for movement with respect to said flux producing means and means for moving the respective reluctance varying means as a unit.

8. An analogue to digital transducer as in claim 7 in which said means providing said flux paths comprises means forming a plurality of air gaps and in which said reluctance varying means comprises means formed of magnetic material adapted to be positioned adjacent said air gaps to reduce the flux path reluctances in the region of said gaps.

9. An analogue to digital transducer as in claim 7 in which said means for varying the reluctances of said paths comprises means for shunting said flux paths.

10. An analogue to digital transducer as in claim 7 in which said voltage producing means includes a magnetized member, a core formed with an air gap, a winding carried by the core and means for driving said magnetized member past said air gap to induce a voltage in said winding.

11. An analogue to digital transducer as in claim 7 in which said means for producing said voltages includes a transformer having a primary winding and a secondary winding and a core formed with an air gap, means for applying a direct current voltage to said primary winding, a plurality of spaced teeth of soft magnetic material and means for driving said teeth past said air gap to induce a voltage in said secondary winding.

12. An analogue to digital transducer as in claim 7 in which the means for producing the voltages includes a plurality of transformers, each of said transformers including a primary winding and a secondary winding and a core formed with an air gap, means connecting said primary windings in series, means for applying an alternating current signal to said primary windings to induce respective voltages in said secondary windings, said means for varying the amplitudes of said signals comprising segments of magnetic material, and means for positioning said segments adjacent said air gaps.

13. An analogue to digital transducer as in claim 7 in which said voltages are of different respective frequencies and means for mixing said voltages for transmission over a single channel to a remote location.

14. An analogue to digital transducer as in claim 7 in which said means for producing said voltages includes a plurality of transformers, each of said transformers comprising a primary winding and a secondary winding and a core formed with an air gap, means for applying a direct current voltage to said primary windings, a plurality of sets of spaced teeth of magnetic material, the intertooth spacing of the teeth of any set being different from the intertooth spacing of any other set, the number of sets of said teeth being equal to the number of said cores and means for moving the teeth of the respective sets past the respective air gaps to induce voltages of different respective frequencies in said secondary windings.

References Cited in the file of this patent

UNITED STATES PATENTS

| | | |
|---|---|---|
| 2,436,639 | Faus | Feb. 24, 1948 |
| 2,558,184 | Lavet | June 26, 1951 |
| 2,734,182 | Rajchman | Feb. 7, 1956 |
| 2,774,957 | Towner | Dec. 18, 1956 |
| 2,793,360 | Beaumont | May 21, 1957 |